United States Patent [19]

Matsuzawa et al.

[11] Patent Number: 5,013,593
[45] Date of Patent: May 7, 1991

[54] INFORMATION STORAGE MEDIUM AND PROCESS FOR PRODUCING THE SAME

[75] Inventors: Hideki Matsuzawa, Odawara; Masao Yabe, Fujinomiya; Tadashi Irie, Odawara; Seiichi Watanabe, Odawara; Yusuke Ishihara, Odawara, all of Japan

[73] Assignee: Fuji Photo Film Co., Ltd., Kanagawa, Japan

[21] Appl. No.: 417,322

[22] Filed: Oct. 5, 1989

[30] Foreign Application Priority Data

Oct. 6, 1988 [JP] Japan ................. 63-252679

[51] Int. Cl.5 .............................. B32B 3/02
[52] U.S. Cl. ........................ 428/64; 428/65; 428/412; 428/913; 369/286; 369/288; 156/60; 346/76 L; 346/135.1; 264/106
[58] Field of Search ............ 369/286, 288; 264/106; 346/76 L, 135.1; 156/60; 428/64, 65, 412, 913

[56] References Cited

U.S. PATENT DOCUMENTS 4,847,827  7/1989  Hayashi et al. .................. 369/286

FOREIGN PATENT DOCUMENTS 62-173656  3/1987  Japan .

Primary Examiner—Patrick J. Ryan
Attorney, Agent, or Firm—Sixbey, Friedman, Leedom & Ferguson

[57] ABSTRACT

Disclosed is an information storage medium having an air-sandwich structure which comprises two disc-shaped substrates joined together through a ring-shaped inner spacer and a ring-shaped outer spacer. These spacers are made of the same kind of resin as those forming the disc substrates and the resin of the spacers has a viscosity-average molecular weight larger than that of the resin of the substrates. Also disclosed is a process for producing the information storage medium by joining the spacers to the disc substrates by means of ultrasonic welding.

8 Claims, 3 Drawing Sheets

INFORMATION STORAGE MEDIUM AND PROCESS FOR PRODUCING THE SAME

BACKGROUND OF THE INVENTION

1. Field of the Invention

The present invention relates to an information storage medium and a process for producing the same. More particularly, the invention relates to an information storage medium having an air-sandwich structure which comprises two disc substrates joined together through spacers and a process for producing the same.

2. Description of Prior Art

Information storage media using high-energy-density beams such as a laser beam have been developed and put into practical use in recent years. The information storage medium (i.e., information recording medium) is called "optical disc" and can be used as video disc, audio disc and disc memory for large-capacity static image files and large-capacity computers. The optical disc basically comprises a recording layer provided on a disc-shaped transparent substrate made of a plastic material or a glass material. An undercoating layer or intermediate layer made of a high-molecular material may be provided on the surface (on which the recording layer is to be provided) of the substrate from the viewpoints of improving smoothness of the surface, adhesion between the substrate and the recording layer and the sensitivity of the resulting optical disc.

Various types of optical discs are known, and generally used in recent years is an optical disc having an air-sandwich structure comprising two disc substrates joined together through a ring-shaped inner spacer and a ring-shaped outer spacer and a recording layer provided on at least one substrate. Further, the joining of the substrates is made in such a manner that the recording layer is positioned inward, from the viewpoint of protection of the recording layer. As a process for producing such information storage medium of air-sandwich structure, a variety of processes have been proposed heretofore, and in those processes the spacers and the disc substrates are prepared from the same resin. However, the information storage medium produced by the conventional processes using the same resin for the preparation of the spacers and the substrates tends to be hardly reduced to satisfactory level in the axial acceleration in face deflection which greatly influences mechanical properties of the resulting optical disc, particularly follow-up properties of a pickup for the tracking of an optical disc on recording or reproducing procedure.

Japanese Patent Provisional Publication No. 62(1987)-173656 discloses that an information storage medium of an air-sandwich structure wherein a modulus of elasticity of its spacer is in the range of 20 to 90% of that of the disc substrate has good adhesion between the spacer and the substrate and high resistance to mechanical shocks and also shows reduced birefringence. In the information storage medium disclosed in the above publication, however, the axial acceleration in face deflection is not sufficiently reduced to a satisfactory level.

SUMMARY OF THE INVENTION

It is an object of the present invention to provide an information storage medium of an air-sandwich structure which is improved in mechanical properties and strength in the portion where its spacers are fixed to its substrates, particularly impact strength in the portions, to show reduced axial acceleration in face deflection.

It is another object of the present invention to provide a process for producing the above-mentioned information storage medium.

There is provided by the invention an information storage medium of air-sandwich structure comprising two disc substrates joined together through a ring-shaped inner spacer and a ring-shaped outer spacer, wherein the spacers are made of the same kind of resin as that forming the substrates and the resin of the spacers has a viscosity-average molecular weight larger than that of the resin of the substrates.

There is also provided by the invention a process for producing an information storage medium of air-sandwich structure comprising two disc substrates joined together through a ring-shaped inner spacer and a ring-shaped outer spacer, wherein the spacers made of the same kind of resin as that forming the substrates, said resin of the spacers having a viscosity-average molecular weight larger than that of the resin of the substrates, are joined to the substrates by means of ultrasonic welding.

The information storage medium produced using as the resin of the spacers a resin having a viscosity-average molecular weight larger than that of the resin of the substrates can be improved in mechanical properties and strength in the welded portion, particularly impact strength in that portion, to show a prominently reduced axial acceleration in face deflection, whereby the follow-up properties of the pickup for the tracking of the medium can be highly enhanced.

DETAILED DESCRIPTION OF THE INVENTION

The information storage medium of the present invention and the process for producing the same are described in detail hereinafter referring to FIGS. 1 to 3 of the attached drawings.

Figure 1:
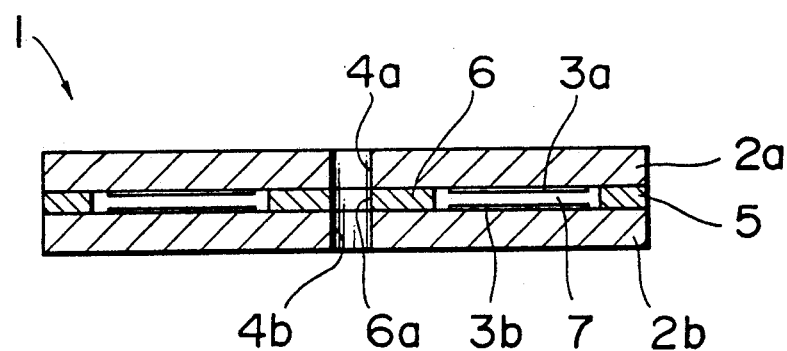
FIG. 1 is a sectional view of one example of the information storage media according to the invention.

FIG. 1 is a sectional view of one example of the information storage media according to the invention.

In FIG. 1, an information storage medium 1 comprises a disc-shaped substrate 2a which is provided with a recording layer 3a on one surface and has a central hole 4a and a disc-shaped substrate 2b which is provided with a recording layer 3a on one surface and has a central hole 4b. The substrate 2a and the substrate 2b are joined together through a ring-shaped outer spacer 5 at the outer periphery portions of the substrates 2a, 2b and a ring-shaped inner spacer 6 at the inner periphery portions of the substrates 2a, 2b in such a manner that the recording layer 3a and the recording layer 2b face each other. Between the substrate 2a and the substrate 2b is formed a space (closed area) 7. Each of the central hole 4a of the substrate 2a and the central hole 4b of the substrate 2b coincides with a central hole 6a of the inner spacer 6.

Materials of the disc-shaped substrates employable in the invention can be selected from various resins which are conventionally employed as substrates for information storage media. Examples of materials of the substrate include acrylic resins such as polymethyl methacrylate; vinyl chloride resins such as polyvinyl chloride and vinyl chloride copolymer; epoxy resins; amorphous polyolefin resins; and polycarbonates. The material of the substrate is selected from the viewpoints of optical characteristics, surface smoothness, processability, handling properties, long-term stability and manufacturing cost. Preferred are polymethyl methacrylates, polycarbonates and epoxy resins from the viewpoints of dimensional stability, transparency and surface smoothness.

Polycarbonates employable in the present invnetion include, for example, homopolycarbonates and copolycarbonates based on one or more of the following bisphenols; hydroquione, resorcinol, dihydroxydiphenyls, bis-(hydroxyphenyl)-alkanes, bis-(hydroxyphenyl)-cycloalkanes, bis-(hydroxyphenyl)-sulfides, bis-(hydroxyphenyl)-ethers, bis-(hydroxyphenyl)-ketones, bis-(hydroxyphenyl)-sulfoxides, bis-(hydroxyphenyl)-sulfones and α,α'-bis-(hydroxyphenyl)-diisopropyl-benzenes and nuclear-alkylated and nuclear-halgenated derivatives thereof. These and other suitable aromatic dihydroxy compounds are descrived, for example, in U.S. Pat. Nos. 3,028,365; 2,999,835; 3,148,172; 3,275,601; 2,991,273; 3,271,367; 3,062,781; 2,970,131 and 2,999,846, in German Offenlegungsschriften Nos. 1,570,703; 2,063,050; 2,063,052; 2,211,956 and 2,211,977, in French Patent Specification No. 1,156,518 and in monograph "H. Shnell Chemistry and Physcs of Polycarbonates, Interscience Publishers, New York, 1964".

Examples of preferred bisphenols are: 4,4'-dihydroxydiphenyl; 2,2-bis-(4-hydroxyphenyl)-propane; 2,4-bis-(4-hydroxyphenyl)-2-methylbutane; 1,1-bis-(4-hydroxyphenyl)-cyclohexane; α,α'-bis-(4-hydroxyphenyl)-p-diisopropyl-benzene; 2,2-bis-(3-methyl-4-hydroxyphenyl)-propane; 2,2-bis-(3-chloro-4-hydroxyphenyl)-propane; bis-(3,5-dimethyl-4-hydroxyphenyl)-methane; 2,2-bis-(3,5-dimethyl-4-hydroxyphenyl)-propane; bis-(3,5-dimethyl-4-hydroxyphenyl)-sulfone; 2,4-bis-(3,5-dimethyl-4-hydroxyphenyl)-2-methylbutane; 1,1-bis-(3,5-dimethyl-4-hydroxyphenyl)-cyclohexane; α,α'-bis-(3,5-dimethyl-4-hydroxyphenyl)-p-diisopropyl-benzene; 2,2-bis-(3,5-dichloro-4-hydroxyphenyl)-propane and 2,2-bis-(3,5-dibromo-4-hydroxyphenyl)-propane.

Particularly preferred bisphenols are, for example: 2,2-bis-(4-hydroxyphenyl)-propane; 1,1-bis-(4-hydroxyphenyl)-cyclohexane; 2,2-bis-(3,5-dimethyl-4-hydroxyphenyl)-propane; 2,2-bis-(3,5-dichloro-4-hydroxyphenyl)-propane and 2,2-bis-(3,5-dibromo-4-hydroxyphenyl)-propane.

Preferred polycarbonares are those which are based on one or more of the bisphenols mentioned as preferred. Particularly preferred polycarbonates are based on 2,2-bis-(4-hydroxyphenyl)-propane and one of the other bisphenols mentioned as particularly preferred. Polycarbonates based on 2,2-bis-(4-hydroxyphenyl)-propane or 2,2-bis-(3,5-dimethyl-4-hydroxyphenyl)-propane alone are also particularly preferred.

The polycarbonates can be prepared by known processes as described in the above-mentioned literature.

The polycarbonates can also be branched by incorporating polyhydroxy compounds in small amounts, for example 0.005-2.0 mol % (relative to the bisphenpols employed). Examples of some of the polyhydroxy compounds which can be used are phloroglucinol; 4,6-dimethyl-2,4,6-tri-(4-hydroxyphenyl)-hept-2-ene; 4,6-dimethyl-2,4,6-tri-(4-hydroxyphenyl)-heptane; 1,3,5-tri-(4-hydroxyphenyl)-benzene; 1,1,1-tri-(4-hydroxyphenyl)-ethane; tri-(4-hydroxyphenyl)-phenylmethane; 2,2-bis(4,4-bis(4-hydroxyphenyl)-cyclohexyl)-propane; 2,4-bis-(4-hydroxyphenyl-isopropyl)-phenol; 2,6-bis-(2'-hydroxy-5'-methyl-benzyl)-4-methyl-phenol; 2,4-dihydroxybenzoic acid; 2-(4-hydroxyphenyl)-2-(2,4-dihydroxyphenyl)-propane and 1,4-bis-(4',4''-dihydroxytriphenyl-methyl)-benzene.

The polycarbonates generally have a viscosity-average molecular weight of 10,000 to 200,000, preferably of 10,000 to 80,000.

As materials for forming the outer spacer 5 and the inner spacer 6, the same kind of resin as that used for the substrates 2a and 2b is employed, and the resin of the spacers 5 and 6 has a viscosity-average molecular weight larger than that of the resin of the substrates 2a and 2b. The term of "same kind of resins" means generally those having the same monomer components more than 80 wt % of the total components consisting of the resins, preferably those having the same components more than 90 wt %, and more preferably those consisting of having the substantially same components. The viscosity-average molecular weight of the resin for the spacers 5 and 6 is preferably 1.3 to 2.0 times as much as the viscosity-average molecular weight of the resin for the substrates 5 and 6. Further, the viscosity-average molecular weight of the resin of the spacers preferably is in the range of 13,000 to 30,000, and the viscosity-average molecular weight of the resin of the substrates preferably is in the range of 10,000 to 20,000.

Examples of materials of the spacers include acrylic resins such as polymethyl methacrylate; vinyl chloride resins such as polyvinyl chloride and vinyl chloride copolymer; epoxy resins; amorphous polyolefin resins; and polycarbonates. Polycarbonates employable for the spacers also include, for example, homopolycarbonates and copolycarbonates based on one or more of the bisphenols mentioned for the resins of the substrate.

The resin of the outer spacer 5 and the inner spacer 6 is the same kind as that of the substrates 2a and 2b, so that the spacers can be reliably and firmly welded to join to the substrates by means of ultrasonic welding. Moreover, since the viscosity-average molecular weight of the resin for the spacers is larger than that of the resin for the substrates, the axial acceleration in face deflection of the resulting information storage medium can be prominently reduced. It is not theoretically clear why the difference between the viscosity-average molecular weight of the resin of the pacers 5, 6 and that of the resin of the substrates 2a, 2b is relative to the degree of the axial acceleration in the face deflection of the resulting storage medium. It is generally known that the melt-initiation temperature of a resin increases as the viscosity-average molecular weight of the resin becomes larger. Accordingly, it is assumed that the resin of the substrate is more easily melted as compared with an energy director of the spacer in the invention, whereby the resin of the spacer on the energy director side penetrates relatively deeply into the resin of the substrate and is welded therewith in the course of ultrasonic welding so as to stabilize the welded state.

The information storage medium of the invention is characterized in the above-mentioned specific conditions with respect to the resin for the outer spacer 5 and the inner spacer 6 and the resin for the substrates 2a and 2b, and there is no other specific limitation, for example, with respect to a process for producing the substrates, a process for producing the recording layers and a process for producing the information storage medium. The processes therefor, materials thereof or the like can be optionally selected from those conventionally employed.

On the surface of the substrate (surface where a recording layer is to be provided) may be provided an undercoating layer (and/or an intermediate layer) to improve surface smoothness and adhesion between the substrate and the recording layer and to prevent the recording layer from being denatured.

Examples of materials of the undercoating layer (and/or the intermediate layer) include high-molecular materials such as polymethyl methacrylate, acrylic acid-methacrylic acid copolymer, nitrocellulose, polyethylene, chlorinated polyolefin, polypropylene and polycarbonate; organic materials such as silane coupling agent; and inorganic materials such as inorganic oxides (e.g., $SiO_2$ and $Al_2O_3$) and inorganic fluorides (e.g., $MgF_2$).

Examples of materials of the recording layer include metals such as Te, Zn, In, Sn, Zr, Al, Ti, Cu, Ge, Au and Pt: semimetals such as Bi, As and Sb; semiconductors such as Si; alloys of these elements; and mixtures thereof. Further, compounds of these metals, semimetals and semiconductors such as sulfides, oxides, borides, silicates, carbides and nitrides and mixtures of these compounds and these metals can be also employed as the materials of the recording layer. Otherwise, dyes, a combination of a dye and a polymer, a combination of a dye and the above metal and a combination of a dye and the above semimetal can also be employed.

The recording layer may contain other metals, semimetals or compounds thereof which are conventionally used as the recording layer material.

The recording layer can be formed on the substrate directly or through an undercoating layer by means of metallizing, sputtering, ion plating or coating. The recording layer may be composed of a single layer or plural layers. The thickness of the recording layer is generally in the range of 100 to 5,500 angstroms, preferably 150 to 3,000 angstroms from the viewpoint of optical density required for optical information recording.

On other surface of the substrate (surface where the recording layer is not provided) may be provided a thin film composed of an inorganic material (e.g., silicon dioxide, tin oxide or magnesium fluoride) or a high-molecular material (e.g., a thermoplastic resin or a photo-setting resin) by means of vacuum metallizing, sputtering or coating to enhance resistance to damage and resistance to moisture.

The recording layer may be provided on the area of the welding portion other than the information-recording area.

The information storage medium of the invention can be produced by interposing the outer spacer and the inner spacer between two disc substrates and joining the spacers to the substrates by means of ultrasonic welding.

One embodiment of the processes for producing the information storage medium of the invention is described below referring to FIG. 2 and FIG. 3.

Figure 2:
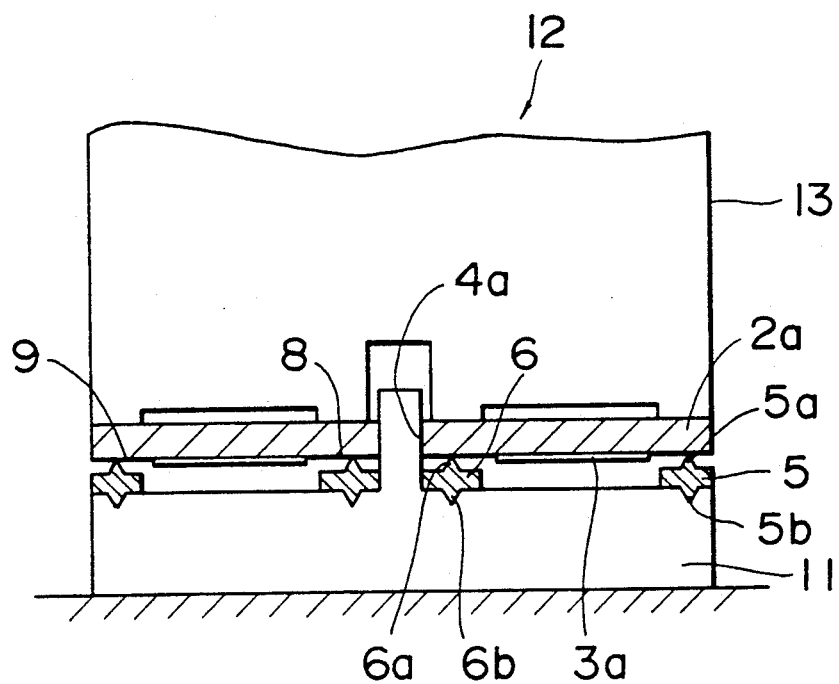
FIG. 2 and FIG. 3 are views illustrating a process for producing an information storage medium according to the invention.

In FIG. 2, a ring-shaped inner spacer 6 and a ring-shaped outer spacer 5 are placed concentrically on a disc-shaped receiving tool 11, and a disc substrate 2a having a recording layer 3a is superposed thereon in such a manner that the recording layer 3a is positioned downward.

A non-recording zone 8 is provided on the outer side of the periphery of a central hole 4a of the substrate 2a and a non-recording zone 9 is provided on the inner side of the outer periphery of the substrate 2a, and between those non-recording zones is provided the recording layer 3a.

The receiving tool 11 is preferably provided with grooves for fitting ring-shaped protrusions of the spacers thereinto to firmly fix the spacers on the receiving tool. In FIG. 2, the ring-shaped protrusions of the inner spacer 6 are indicated by 6a, 6b, and the ring-shaped protrusions of the outer spacer 5 are indicated by 5a, 5b.

An ultrasonic applying horn 13 of an ultrasonic welding machine 12 is arranged at the portions on the surface of the disc substrate 2a corresponding to the spacers 5 and 6 so as to give ultrasonic energy to the disc substrate 2a and the spacers 5 and 6.

Figure 3:
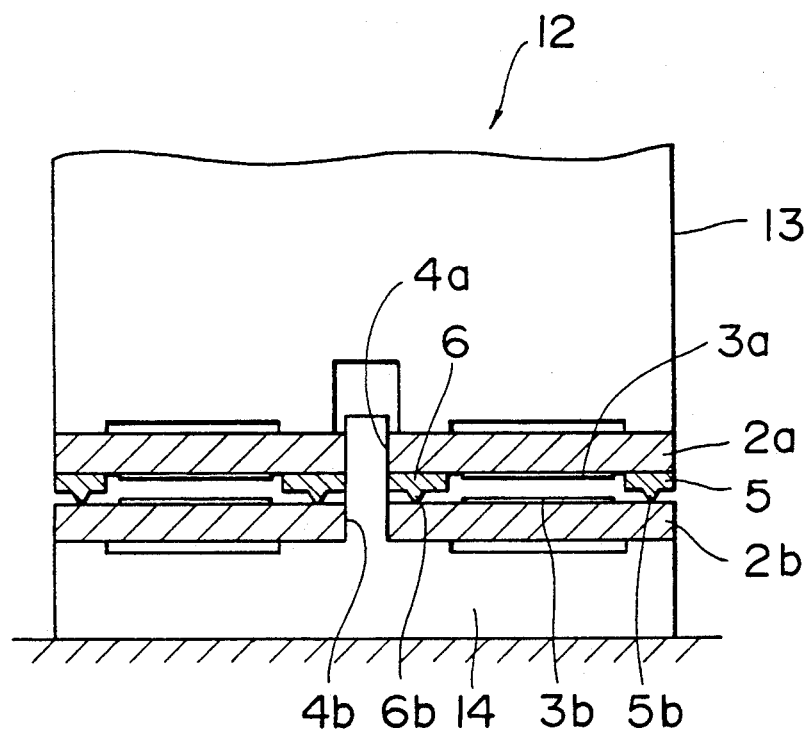

In FIG. 3, a disc substrate 2b having a recording layer 3b is placed on a disc-shaped receiving tool 14 concentrically in such a manner that the recording layer 3b is positioned upward, and thereon the disc substrate 2a provided with spacers which has been obtained in the first step is placed positioning the recording layer side (spacer side) downward. The ultrasonic applying horn 13 of the ultrasonic welding machine 12 is arranged at the portions on the surface of the disc substrate 2a corresponding to the spacers in the same manner as shown in FIG. 2 so as to give ultrasonic energy to the disc substrate 2b and the spacers.

In the process of the invention, in the first place, the inner spacer 6 and the outer spacer 5 are placed on the disc-shaped receiving tool 11 concentrically, and the disc substrate 2a having the recording layer 3a is superposed thereon in such a manner that the recording layer is positioned downward, as shown in FIG. 2.

In the second place, the ultrasonic applying horn of the ultrasonic welding machine is brought into contact with the portion on the surface of the disc substrate 2a corresponding to each spacer, and ultrasonic energy is applied to the disc substrate 2a and the spacers to weld to join the spacers 5 and 6 to the substrate 2a.

Then, as shown in FIG. 3, the disc substrate 2b is placed on a disc-shaped receiving tool 14 concentrically in such a manner that the recording layer 3b is positioned downward, and then the resin substrate 2a provided with spacers which has been obtained in the step shown in FIG. 2 is arranged on the substrate 2b positioning the recording layer side (spacer side) downward.

Subsequently, the ultrasonic applying horn 13 of the ultrasonic welding machine 12 is brought into contact with the portion on the surface of the disc substrate 2a corresponding to each spacer, and ultrasonic energy is applied to the disc substrate 2b and the spacers to weld to join the spacers 5 and 6 to the substrate 2b.

Thus, an information storage medium having an air-sandwich structure shown in FIG. 1 is produced.

The information storage medium obtained by the above-described process is improved in mechanical properties and strength in the welded portion, particularly impact strength in that portion, to show a reduced axial acceleration in face deflection, and thereby the follow-up properties of the pickup for the tracking of the medium on recording or reproducing procedure can be prominently enhanced. Accordingly, the information storage medium of the invention is excellent in the recording and reproducing properties.

One preferred process for producing an information storage medium according to the invention is described above referring to FIGS. 2 and 3, but the present invention is by no means limited thereto. For example, there is no specific limitation on the shape of the spacer, the shape of the ultrasonic applying horn, the shape of the receiving tool, etc.

The example of the invention and the comparison example are given below, but these examples by no means restrict the the invention.

The viscosity-average molecular weight of polycarbonates used in the following examples is determined as follows.

Determination of Viscosity-Average Molecular Weight

In methylene chloride is dissolved a polycarbonate sample. In the solution is placed an adsorbent for adsorbing additives contained in the sample resin. The obtained mixture is filtered to remove the adsorbent and methylene chloride in the mixture is evaporated to leave a pure polycarbonate. 1 g of the pure polycarbonate is dissolved in 100 ml of methylene chloride.

Using a indicator tube, a period of time for passing predetermined amount of the obtained solution through the predermined area of the indicator tube and a period of time for passing the same amount of methylene chloride therethrough, are separately measured at 25° C.

The period of time for passing the solution is substituted in $t_s$ of the following equation (1) and the period of time for methylene chloride is substituted in $t_o$ to obtain a value of an specific viscosity $[\eta_{sp}]$:

$$[\eta_{sp}] = \frac{t_s - t_o}{t_o} \quad (1)$$

Huggins' equation leads to the following equation (2).

$$[\eta] = \frac{-1 + \sqrt{1 - 4K'\eta_{sp}}}{2K'C} \quad (2)$$

in which $[\eta]$ is an intrinsic viscosity, C means a concentration of the solution (g/100 ml) and $K'$ is 0.45 (a constant with respect to a solvent, a solution, a solute, etc. involved in the measurement). The above known values ($K'$, C and $[\eta_{sp}]$) are substituted in equation (2) to obtain a value of $[\eta_{sp}]$.

Then, the value of $[\eta]$ is substituted in the following equation (3) (Schnell's equation) to obtain a value of a viscosity-average molecular weight [M]:

$$[\eta] = 1.23 \times 10^{-4} \cdot M^{0.83} \quad (3)$$

EXAMPLE 1

Polycarbonate having a viscosity-average molecular weight of 15,300 (Teijin Panlite AD5503, available from Teijin Co., Ltd.) was subjected to injection molding to prepare a disc-shaped polycarbonate substrate provided with pregroove (outer diameter: 130 mm, diameter of central hole: 15 mm, thickness: 1.2 mm, depth of pregroove: 800 angstroms, track pitch: 1.6 μm). On the substrate is coated a coating solution containing polyolefin chloride (solution of 0.3 part by weight of polyethylene in a mixture of 10 parts by weight of methyl ethyl ketone and 100 parts by weight of cyclohexanone) using a spin coater, and the coated solution was dried to prepare an intermediate layer having a thickness of 500 angstroms on the substrate. On the intermediate layer were deposited In, GeS and Au together (In:GeS:Au=66:22:12, by weight), to form a recording layer having a thickness of 300 angstroms.

Thus, a disc substrate consisting essentially of a substrate and a recording layer was obtained.

Separately, a ring-shaped outer spacer and a ring-shaped inner spacer were produced by means of injection molding using polycarbonate having a viscosity-average molecular weight of 22,000 (Teijin Panlite L-1225, available from Teijin Co., Ltd.).

The obtained spacers were interposed between the two disc substrates, and the spacers were joined to the substrates by means of ultrasonic welding in the same manner as described before referring to FIGS. 2 and 3, to produce an information storage medium (optical disc) having an air-sandwich structure shown in FIG. 1.

The ultrasonic welding was carried out using an ultrasonic welding machine (Model 8800 produced by Blanson Co., Ltd.) under the conditions of a pressure of 20 psi, oscillating time of 0.1 second and a height of energy director (sectional shape: regular triangle) of 0.2 mm.

COMPARATIVE EXAMPLE 1

The procedures of Example 1 were repeated except for using the same material (Teijin Panlite AD5503, available from Teijin Co., Ltd.) for the preparation of the outer spacer and the inner spacer as that of the disc substrate to produce an information storage medium (optical disc).

Evaluation of Optical Disc

Six optical discs obtained in Example 1 and six optical discs obtained in Comparison Example 1 were measured on the axial acceleration in face deflection at 1,800 r.p.m., and the obtained values of the axial acceleration were subjected to analysis of variance to evaluate the optical discs.

Figure 4:
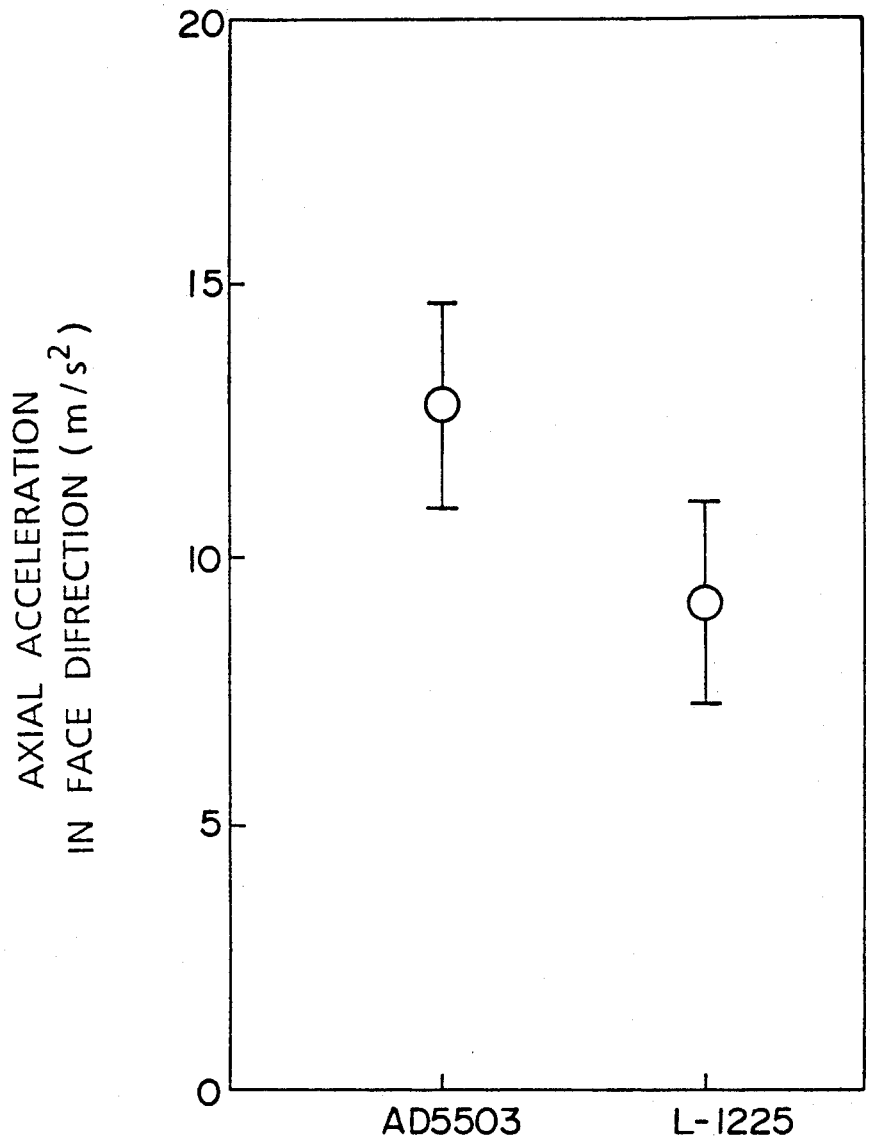
FIG. 4 graphically shows axial acceleration in face deflection with respect to optical discs obtained in Example 1 and Comparison Example 1.

The results on the evaluation of the axial acceleration of face deflection are shown in FIG. 4.

The optical discs obtained in Example 1 had an average value in the axial acceleration of 9.2 m/sec.$^2$, while the optical discs obtained in Comparison Example 1 had an average value of the axial acceleration of 12.8 m/sec.$^2$. The confidence limit of the average value was ±1.9 m/sec.$^2$, so that the results obtained by the analysis of variance showed a significant level of 5%.

It has been confirmed from the results that the information storage media of the present invention shows prominently smaller axial acceleration in face deflection, and therefore, it is clear that the information storage media of the invention have highly enhanced follow-up properties of the pickup for the tracking of the optical disc on recording or reproducing procedure.

We claim:

1. An information storage medium of air-sandwich structure comprising two disc-shaped substrates joined together through a ring-shaped outer spacer and a ring-shaped inner spacer, wherein each of the spacers is made of the same kind of resin as that forming the disc-shaped substrates and the resin of the spacers has a viscosity-average molecular weight in the range of 1.3 to 2.0 times the viscosity-average molecular weight of the resin of the disc-shaped substrates.

2. The information storage medium as claimed in claim 1, wherein the viscosity-average molecular weight of the resin of the spacers is in the range of 13,000 to 30,000, and the viscosity-average molecular weight of the resin of the disc-shaped substrates is in the range of 10,000 to 20,000.

3. The information storage medium as claimed in claim 1, wherein the resin for the spacers and the disc-shaped substrates is polycarbonate.

4. The information storage medium as claimed in claim 1, wherein each of the spacers is provided with an energy director on both sides thereof.

5. A process for an information storage medium of air-sandwich structure comprising two disc-shaped substrates joined together through a ring-shaped outer spacer and a ring-shaped inner spacer, wherein the spacers are made of the same kind of resin as that forming the substrates, said resin of the spacers having a viscosity-average molecular weight in the range of 1.3 to 2.0 times the viscosity-average molecular weight of the resin of the disc-shaped substrates, are joined to the substrates by means of ultrasonic welding.

6. The process as claimed in claim 1, wherein the viscosity-average molecular weight of the resin of the spacers is in the range of 13,000 to 30,000, and the viscosity-average molecular weight of the resin of the disc-shaped substrates is in the range of 10,000 to 20,000.

7. The process as claimed in claim 1, wherein the resin of the spacers and the disc-shaped substrates is polycarbonate.

8. The process as claimed in claim 1, wherein each of the spacers is provided with an energy director on both sides thereof.

* * * * *